(12) United States Patent
Mukherjee et al.

(10) Patent No.: US 7,657,705 B2
(45) Date of Patent: Feb. 2, 2010

(54) METHOD AND APPARATUS OF A RAID CONFIGURATION MODULE

(75) Inventors: Subhankar Mukherjee, Duluth, GA (US); Amit Pandya, Norcross, GA (US)

(73) Assignee: LSI Corporation, Milpitas, CA (US)

( * ) Notice: Subject to any disclaimer, the term of this patent is extended or adjusted under 35 U.S.C. 154(b) by 572 days.

(21) Appl. No.: 11/528,983

(22) Filed: Sep. 27, 2006

(65) Prior Publication Data

US 2008/0077736 A1 Mar. 27, 2008

(51) Int. Cl.
*G06F 12/00* (2006.01)

(52) U.S. Cl. .................. 711/114; 711/170

(58) Field of Classification Search ............. 711/114, 711/170
See application file for complete search history.

(56) References Cited

U.S. PATENT DOCUMENTS

| | | | | |
|---|---|---|---|---|
| 5,983,283 | A * | 11/1999 | Senator et al. | 719/321 |
| 6,098,119 | A * | 8/2000 | Surugucchi et al. | 710/10 |
| 7,454,566 | B1 * | 11/2008 | Overby | 711/114 |
| 2004/0133742 | A1 * | 7/2004 | Vasudevan et al. | 711/114 |
| 2007/0143540 | A1 * | 6/2007 | Lee et al. | 711/114 |

* cited by examiner

*Primary Examiner*—Pierre-Michel Bataille
*Assistant Examiner*—John P Fishburn
(74) *Attorney, Agent, or Firm*—Raj Abhyanker LLP

(57) ABSTRACT

A method may include providing a management application with firmware information of a RAID controller and/or system information of a particular set of physical disks forming a particular underlying RAID implementation that is relevant to creating a configuration on the RAID controller of the particular underlying RAID implementation to enable the management application to configure the RAID controller of set of physical disks forming any RAID implementation without prior knowledge of firmware information of the RAID controller and system information of at least one of set of physical disks forming a RAID implementation and determining the configuration of the particular underlying RAID implementation using a decision making process of the management application based on of a firmware information of the RAID controller and system information of the particular set of physical disks forming the particular underlying RAID implementation to determine the configuration of the particular underlying RAID implementation.

18 Claims, 9 Drawing Sheets

| CONTROLLER 400 | CONFIGURED? 402 | CONFIGURATION ALLOWED? 404 | POSSIBLE RAID LEVELS 406 | READ/WRITE 408 | STRIP SIZE 410 | MIN/MAX DISK PER SPAN 412 |
|---|---|---|---|---|---|---|
| CONTROLLER 1 | YES | YES | 0, 3, 4 | R, W | 8KB, 32KB | 2/12 |
| CONTROLLER 2 | NO | YES | 1, 2 | R, W | 64KB, 128KB | 4/8 |
| | • | • | • | • | | |
| | • | • | • | • | | |
| | • | • | • | • | | |

FIGURE 4

METHOD AND APPARATUS OF A RAID CONFIGURATION MODULE

FIELD OF TECHNOLOGY

This disclosure relates generally to the technical fields of electronics, digital circuit technology and electronic design automation and, in one example embodiment, to a method and/or an apparatus of a RAID configuration module.

BACKGROUND

A redundant array of independent disks (e.g., RAID) system may be a data storage scheme that utilizes multiple physical disks (e.g., hard disk drives) to share and/or to replicate data among the physical drives. A RAID system may increase data integrity, fault-tolerance, throughput, and/or capacity compared to a single physical drive. The RAID system may combine multiple physical disks into a single logical unit and may be seen by an operating system (e.g., Windows, UNIX, and/or Mac OSX, etc.) to be implemented on a server computer, and/or personal computers.

A RAID controller may communicate with the physical disks through a bus (e.g., IDE, SCSI, SATA, SAS, and/or fiber channel, etc.) to manage physical storage units in the RAID system and to present the physical storage units to the operating system (e.g., Windows, UNIX, and/or Mac OSX, etc.) as logical units. To configure the RAID controller, a RAID management application may be utilized to program an underlying RAID system to a desired RAID configuration (e.g., RAID level, number of physical disks, combination of physical disks, etc.). However, the RAID management application may be specific to a particular RAID implementation logic and/or firmware details of the RAID controller. As a result, base programming for the RAID management application may become non-extensible and/or non-reusable due to re-programming requirements in the RAID management application for a different RAID implementation (e.g., a different RAID implementation logic, level, and/or different firmware details of the RAID controller, etc.).

The RAID management application may need to possess the ability to acquire system information (e.g., available physical drives, valid RAID levels, and/or available virtual disk size, etc.) posing an additional constraint on coding of the RAID management application while bounding utilization of the RAID management application to a particular RAID implementation (e.g., the particular RAID implementation logic, level, and/or particular firmware details of the RAID controller, etc.). Further, inefficiencies due to code duplication is exacerbated between different RAID management applications due to minor differences in the different RAID implementations (e.g., the different RAID implementation logic, level, and/or different firmware details of the RAID controller, etc.) that require minor code modification of the RAID management applications to ensure usability (e.g., compatibility, programmability, etc.) with each different RAID implementation.

SUMMARY

A method and/or an apparatus of a RAID configuration module is disclosed. In one aspect, a method includes providing a management application with any of a firmware information of a RAID controller and system information of a particular set of physical disks forming a particular underlying RAID (e.g., the particular set of physical disks forming the particular underlying RAID implementation is any of an un-configured set of physical disks and/or a configured set of physical disks having space available for configuration) implementation is relevant to creating a configuration on the RAID controller of the particular underlying RAID implementation to enable the management application to configure the RAID controller of any set of physical disks forming any RAID implementation without prior knowledge of the firmware information of the RAID controller and/or system information of set of physical disks forming a RAID implementation and/or determining a configuration of the particular underlying RAID implementation using a decision making process of the management application based on any of the firmware information of the RAID controller and/or system information of the particular set of physical disks forming the particular underlying RAID implementation to determine the configuration of the particular underlying RAID implementation.

The method may further include determining configurability of the particular set of physical disks forming the particular underlying RAID implementation based on an availability of un-configured physical disks of the particular set of physical disks and a maximal RAID volume capacity and/or RAID array capacity of the RAID controller of the particular underlying RAID implementation. In addition, the method may further include retrieving a list of un-configured and usable physical disks of the particular set of physical disks and/or obtaining valid RAID levels of the particular set of physical disks based on an any of the firmware information of the RAID controller and the availability of un-configured and/or usable physical disks of the particular set of physical disks forming the particular underlying RAID implementation. Also, the method may further include compiling a list of read and write attributes of the particular set of physical disks forming the particular underlying RAID implementation and a list of supported cache policy and/or strip size based on the firmware information of the RAID controller.

The method may further include determining a span count and/or physical disk count of a given RAID level based on the particular underlying RAID implementation and the firmware information of the RAID controller. Similarly, the method may further include determining usability of each of the particular set of physical disks based on a disk type and an availability of physical disks of a same disk type that is compatible with a particular RAID level. The method may further also include computing an available RAID volume size based on a given selection of the particular RAID level and/or a list of the particular set of physical disks of all spans and strip size of the management application.

Furthermore, the method may further include determining validity of selected parameters of the management application to create the configuration of the particular underlying RAID implementation and creating the configuration of the particular set of underlying physical disks forming the particular underlying RAID implementation through the RAID controller.

In another aspect, a RAID controller includes a host I/O port coupled to communicate with a host computer, a physical disk I/O port coupled to communicate with a set of physical disks that forms a RAID implementation, a host I/O processor that communicates with the host I/O port to perform I/O transactions with the host computer through the host I/O port, a cache memory, a physical disk I/O processor to access host data in the cache memory and to communicate with the set of physical disks and a configuration module to enable a management application to provide the management application with system information of a particular set of physical disks forming a particular underlying RAID implementation (e.g., the particular set of physical disks forming the particular underlying RAID implementation may be any of an un-configured set of physical disks and a configured set of physical disks having space available for configuration) that is relevant to creating a configuration on the RAID controller of the particular underlying RAID implementation to enable the management application to configure any set of physical disks forming any RAID implementation without prior knowledge of system information of an any set of physical disks.

The configuration module may determine configurability of the particular set of physical disks forming the particular underlying RAID implementation based on an availability of un-configured physical disks of the particular set of physical disks and a maximal RAID volume capacity and/or RAID array capacity of the RAID controller of the particular underlying RAID implementation. In addition, the configuration module may retrieve a list of un-configured and/or usable physical disks of the particular set of physical disks and/or obtaining valid RAID levels of the particular set of physical disks based on the availability of un-configured and/or usable physical disks of the particular set of physical disks forming the particular underlying RAID implementation.

Furthermore, the configuration module may compile a list of read and write attributes of the particular set of physical disks forming the particular underlying RAID implementation and/or a list of supported cache policy and/or strip size based on a firmware information of the RAID controller. Also, the configuration module may determine any of a minimum required and maximum allowed span count and/or physical disk count of a given RAID level based on the particular underlying RAID implementation. The configuration module may determine usability of each of the particular set of physical disks based on a disk type and/or an availability of physical disks of a same disk type that may be compatible with a particular RAID level.

In addition, the configuration module may compute an available RAID volume size based on a given selection of the particular RAID level and/or the list of the particular set of physical disks of all spans and strip size of the management application. The configuration module may determine validity of selected parameters of the management application to create the configuration of the particular underlying RAID implementation and/or creating the configuration of a particular set of underlying physical disks forming the particular underlying RAID implementation.

In yet another aspect, a system includes a RAID controller module that is configured to utilize of a set of physical disks forming any RAID implementation, a configuration module coupled to the RAID controller module that obtains any of a firmware information of the RAID controller module and system information of a particular set of physical disks forming a particular underlying RAID implementation that is relevant to creating the configuration on a RAID controller module of the particular underlying RAID implementation, and/or a management module (e.g., the configuration module facilitates a decision making process of the management module based on any of the firmware information of the RAID controller module and system information of the particular set of physical disks forming the particular underlying RAID implementation to determine the configuration of the particular underlying RAID implementation) coupled to the configuration module that is able to configure the RAID controller module of any set of physical disks forming any RAID implementation without prior knowledge of the firmware information of the RAID controller module and/or system information of the any set of physical disks forming any of the RAID implementation through obtaining the firmware information and/or system information via the configuration module during configuration.

The methods, systems, and apparatuses disclosed herein may be implemented in any means of achieving various aspects, and may be executed in a form of machine-readable medium embodying a set of instructions that, when executed by a machine, cause the machine to perform any of the operations disclosed here in. Other features will be apparent from the accompanying drawings and from the detailed description that follows.

BRIEF DESCRIPTION OF THE DRAWINGS

Example embodiments are illustrated by way of example and not limitation in the figures of the accompanying drawings, in which like references indicate similar elements and in which:

FIG. 4 is a table view of content provided to the management module of FIG. 1 by the configuration module of FIG. 2, according to one embodiment.

Other features of the present embodiments will be apparent from the accompanying drawings and from the detailed description that follows.

DETAILED DESCRIPTION

A method and/or an apparatus of a RAID configuration module is disclosed. In the following description, for the purposes of explanation, numerous specific details are set forth in order to provide a thorough understanding of the various embodiments. It will be evident, however to one skilled in an art that the various embodiments may be practiced without these specific details.

Figure 1:
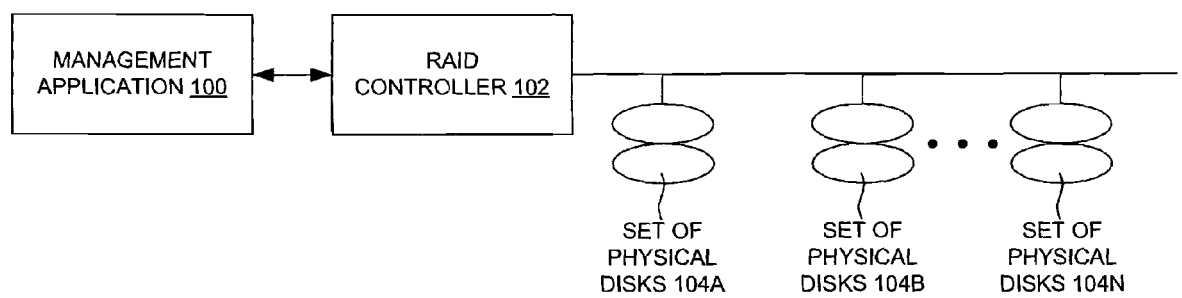
FIG. 1 is a schematic block diagram of a management module that communicates with a set of physical disks through a RAID controller, according to one embodiment.
Figure 2:
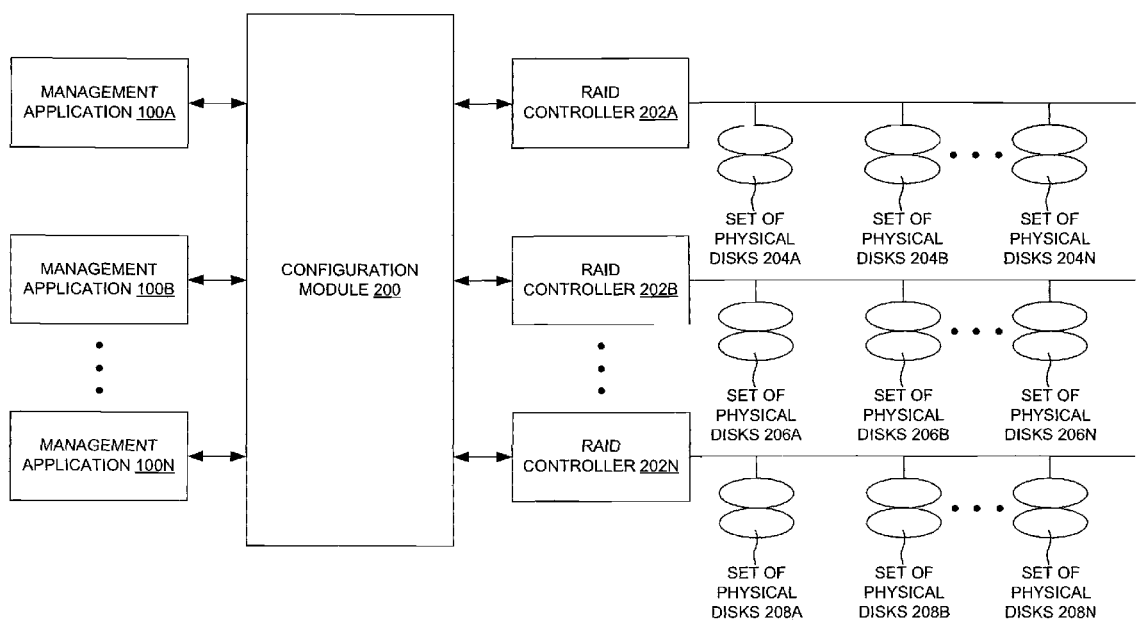
FIG. 2 is a schematic block diagram of a plurality of management modules that communicate with a plurality of RAID controllers through a configuration module, according to one embodiment.

In one embodiment, a method includes providing a management application (e.g., a management application 100 of FIGS. 1-2) with any of a firmware information of a RAID controller (e.g., the RAID controller 102, 202 of FIG. 1-2), and system information of a particular set of physical disks (e.g., a set of physical disks 104, 204, 206, 208 of FIGS. 1-2)

forming a particular underlying RAID implementation that is relevant to creating a configuration on the RAID controller (e.g., the RAID controller 102, 202 of FIG. 1-2) of the particular underlying RAID implementation to enable the management application to configure the RAID controller (e.g., the RAID controller 102, 202 of FIG. 1-2) of any set of physical disks forming RAID implementation without prior knowledge of the firmware information of the RAID controller (e.g., the RAID controller 102, 202 of FIG. 1-2) and system information of set of physical disks forming a RAID implementation through, determining a configuration of the particular underlying RAID implementation using a decision making process of the management application (e.g., the management application 100 of FIGS. 1-2) based on the firmware information of the RAID controller (e.g., the RAID controller 102, 202 of FIG. 1-2) and system information of the particular set of physical disks (e.g., the set of physical disks 104, 204, 206, 208 of FIGS. 1-2) forming the particular underlying RAID implementation to determine the configuration of the particular underlying RAID implementation.

In another embodiment, a RAID controller (e.g., a RAID controller 102, 202 of FIG. 1-2), includes a host I/O port coupled to communicate with a host computer, physical disk I/O port coupled to communicate with a set of physical disks (e.g., a set of physical disks 104, 204, 206, 208 of FIGS. 1-2) that forms a RAID implementation, a host I/O processor that communicates with the host I/O port to perform I/O transactions with the host computer through the host I/O port, a cache memory, a physical disk I/O processor to access host data in the cache memory and to communicate with the set of physical disks (e.g., the set of physical disks 104, 204, 206, 208 of FIGS. 1-2) and a configuration module to enable a management application (e.g., a management application 100 of FIGS. 1-2) to provide the management application (e.g., the management application 100 of FIGS. 1-2) with system information of a particular set of physical disks (e.g., the set of physical disks 104, 204, 206, 208 of FIGS. 1-2) forming a particular underlying RAID implementation is relevant to creating the configuration on the RAID controller (e.g., the RAID controller 102, 202 of FIG. 1-2) of the particular underlying RAID implementation to enable the management application to configure the set of physical disks (e.g., the set of physical disks 104, 204, 206, 208 of FIGS. 1-2) forming the RAID implementation without prior knowledge of system information of set of physical disks (e.g., the set of physical disks 104, 204, 206, 208 of FIGS. 1-2).

In yet another embodiment, a system includes a RAID controller module (e.g., a RAID controller 102, 202 of FIG. 1-2) that is configured to utilize of a set of physical disks forming RAID implementation, a configuration module coupled to the RAID controller module (e.g., the RAID controller 102, 202 of FIG. 1-2) that obtains any of a firmware information of the RAID controller module (e.g., the RAID controller 102, 202 of FIG. 1-2) and system information of a particular set of physical disks (e.g., the set of physical disks 104, 204, 206, 208 of FIGS. 1-2) forming a particular underlying RAID implementation that is relevant to creating a configuration on the RAID controller module (e.g., the RAID controller 102, 202 of FIG. 1-2) of the particular underlying RAID implementation and a management module coupled to the configuration module that is able to configure the RAID controller module (e.g., the RAID controller 102, 202 of FIG. 1-2) of the set of physical disks (e.g., the set of physical disks 104, 204, 206, 208 of FIGS. 1-2) forming RAID implementation without prior knowledge of a firmware information of the RAID controller module (e.g., the RAID controller 102, 202 of FIG. 1-2) and system information of the any set of physical disks (e.g., the set of physical disks 104, 204, 206, 208 of FIGS. 1-2) forming the RAID implementation through obtaining the firmware information and system information via the configuration module during configuration.

FIG. 1 is a schematic block diagram of a management module 100 that communicates with a set of physical disks 104A, 104B, 104N through a RAID controller 102, according to one embodiment.

The management module 100 may be an upper level application that may be able to configure a RAID implementation using system specific information which may be available physical drives, possible RAID levels, and/or available virtual disks, etc. The RAID controller 102 may communicate with the set of physical disks 104 through a bus (e.g., IDE, SCSI, SATA, SAS, and/or fiber channel, etc.) to manage each of the set of physical disks 104A, 104B, 104N in the RAID implementation and/or to present the set of physical disks 104A, 104B, 104N as logical units. The RAID controller 102 may include a host I/O port that communicates with a host I/O processor and a physical disk I/O processor to the set of physical disks 104. A physical disk I/O port may include a number of physical I/O ports to communicate with the set of physical disks 104. A software process of the management module 100 may include methods of acquiring information about a underlying RAID controller and the set of physical disks 104 to configure the RAID controller and the RAID implementation.

In another embodiment, the RAID controller 202 may include the host I/O port coupled to communicate with a host computer, physical disk I/O port coupled to communicate with a set of physical disks that forms a RAID implementation, a host I/O processor that communicates with the host I/O port to perform I/O transactions with the host computer through the host I/O port, a cache memory, the physical disk I/O processor to access host data in the cache memory and to communicate with the set of physical disks, and/or a configuration module to provide a management application with system information of a particular set of physical disks forming a particular underlying RAID implementation that may be relevant for creating a configuration on the RAID controller of the particular underlying RAID implementation to enable the management application to configure at least one of physical disks forming any RAID implementation without prior knowledge of system information of the at least one of physical disks.

In yet another embodiment, a system may include a RAID controller module (e.g., the RAID controller 102, 202 of FIG. 1-2) that may be configured to utilize of the set of physical disks forming any RAID implementation, a configuration module coupled to the RAID controller module (e.g., the RAID controller 102, 202 of FIG. 1-2) that obtains any of the firmware information of the RAID controller module (e.g., the RAID controller 102, 202 of FIG. 1-2) and system information of the particular set of physical disks forming the particular underlying RAID implementation that may be relevant for creating a configuration on a RAID controller module (e.g., the RAID controller 102, 202 of FIG. 1-2) of the particular underlying RAID implementation, and/or a management module (e.g., the management application 100 of FIGS. 1-2) coupled to the configuration module (e.g., the management application 100 of FIGS. 1-2) that may be able to configure the RAID controller module (e.g., the RAID controller 102, 202 of FIG. 1-2) of any set of physical disks forming any RAID implementation without prior knowledge of the firmware information of the RAID controller module (e.g., the RAID controller 102, 202 of FIG. 1-2) and system information of the any set of physical disks forming any of the RAID implementation through obtaining the firmware information and system information via the configuration module during configuration. The configuration module may also facilitates a decision making process of the management module (e.g., the management application 100 of FIGS. 1-2) based on any of the firmware information of the RAID controller module (e.g., the RAID controller 102, 202 of FIG. 1-2) and system information of the particular set of physical disks forming the particular underlying RAID implementation to determine the configuration of the particular underlying RAID implementation.

FIG. 2 is a schematic block diagram of the management modules 100 A-N that communicate with RAID controllers 202 A-N through a configuration module 200, according to one embodiment.

The management module 100 A-N may be an upper level application that may able to configure the RAID implementation using system specific information such as available physical drives, possible RAID levels, and/or available virtual disks, etc. The RAID controller 202 A-N may communicate with the set of physical disks 204A-N, 206A-N, 208A-N through the bus (e.g., IDE, SCSI, SATA, SAS, and/or fiber channel, etc.) to manage each of the set of physical disks 104A, 104B, 104N in the RAID implementation and/or to present the set of physical disks 204A-N, 206A-N, 208A-N as logical units. The RAID controller 202 A-N may include the host I/O port that communicates with the host I/O processor and the physical disk I/O processor to the set of physical disks 204A-N, 206A-N, 208A-N. The physical disk I/O port may include a number of physical I/O ports to communicate with the set of physical disks 204A-N, 206A-N, 208A-N. The software process of the management module 100 A-N may communicate with the configuration module 200 to acquiring information about the underlying RAID controller and the set of physical disks 204A-N, 206A-N, 208A-N to configure the RAID controller and RAID implementation.

For example the configuration module 200 may provide the management application (e.g., the management module 100) with any of the firmware information of a RAID controller (e.g., the RAID controller 202) and system information of the particular set of physical disks (e.g., the set of physical disks 204, 206, 208) forming a particular underlying RAID implementation that may be relevant for creating the configuration on the RAID controller of the particular underlying RAID implementation to enable the management application to configure the RAID controller (e.g., the RAID controller 202) of any set of physical disks forming any RAID implementation without prior knowledge of firmware information of the RAID controller (e.g., the RAID controller 202) and system information of a any set of physical disks (e.g., the set of physical disks 204, 206, 208) forming any of the RAID implementation and determining the configuration of the particular underlying RAID implementation using the decision making process of the management application based on any of the firmware information of the RAID controller and system information of the particular set of physical disks forming the particular underlying RAID implementation to determine the configuration of the particular underlying RAID implementation.

The particular set of physical disks forming the particular underlying RAID implementation may be an un-configured set of physical disks (e.g., the set of physical disks 204, 206, 208) and/or a configured set of physical disks having space available for configuration. The configurability of the particular set of physical disks forming the particular underlying RAID implementation based on an availability of un-configured physical disks of the particular set of physical disks and a RAID volume capacity and RAID array capacity of the RAID controller of the particular underlying RAID implementation may be determined by the configuration module 200. The configuration module may also retrieve a list of un-configured and usable physical disks of the particular set of physical disks and obtain valid RAID levels of the particular set of physical disks based on the any of the firmware information of the RAID controller and the availability of un-configured and usable physical disks of the particular set of physical disks forming the particular underlying RAID implementation.

A list of read and write attributes of the particular set of physical disks forming the particular underlying RAID implementation and a list of supported cache policy and strip size based on the firmware information of the RAID controller may also be determined by the configuration module 200. Usability of each of the particular set of physical disks may be determined by the configuration module 200 based on a disk type and an availability of physical disks of a same disk type that is compatible with a particular RAID level. In addition, the configuration module may also compute an available RAID volume size based on a given selection of the particular RAID level and the list of the particular set of physical disks of all spans and strip size of the management application and determine validity of selected parameters of the management application to create the configuration of the particular underlying RAID implementation and creating the configuration of the particular set of underlying physical disks forming the particular underlying RAID implementation through the RAID controller.

Figure 3:
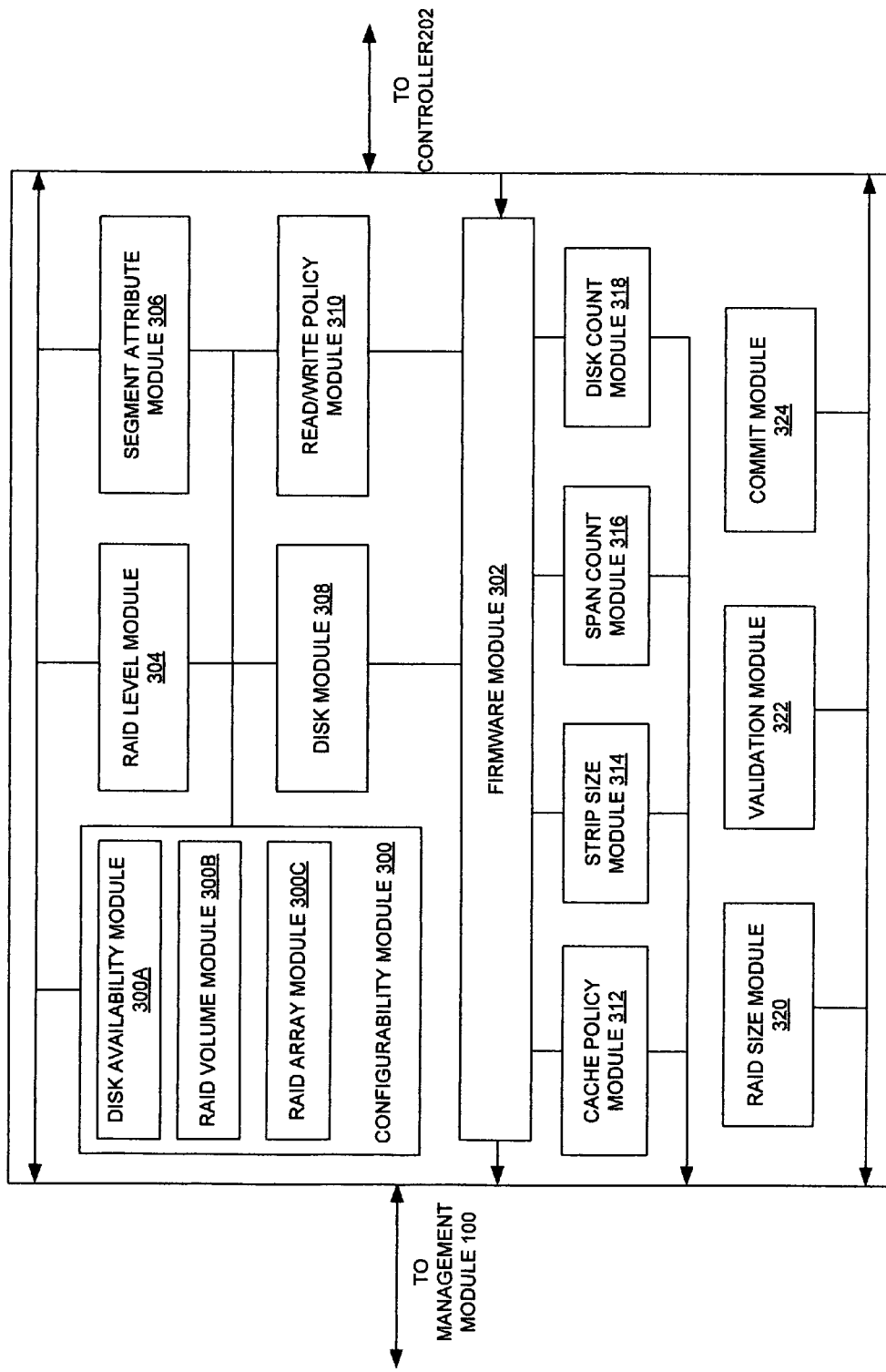
FIG. 3 is a exploded view of the configuration module of FIG. 2, according to one embodiment.

FIG. 3 is an exploded view of the configuration module 200, according to one embodiment. The configuration module 200 may include a configurability module 300, a disk availability module 300A, a RAID volume module 300B, a RAID array module 300C, a firmware module 302, a RAID level module 304, a segment attribute module 306, a disk module 308, a read/write policy module 310, a cache policy module 312, a strip size module 314, a span count module 316, a disk count module 318, a RAID size module 320, a validation module 322, and/or a commit module 324.

The configuration module 200 masks an underlying RAID implementation logic and firmware details of RAID controller 202A-N through exposing an interface to a management module (e.g., a management module of 100 FIG. 1) to create the configuration on the RAID controller (e.g., a RAID controller 202A-N of FIG. 2). The configuration module may enable the management module (e.g., the management module of 100 FIG. 1) to create a configuration without possessing prior knowledge of a underlying hardware information.

The disk availability module 300A, the RAID volume module, and/or the RAID array module may be utilized by the configurability module 300 to determine whether configuration is allowed on the given set of physical disks (e.g., a set of physical disks 204, 206, and/or 208 of FIG. 2). Availability of un-configured physical disks may be determined by the disk availability module 300A. In addition, RAID controller 202A-N occupancy and a number of RAID volumes and RAID arrays compatible with the RAID controller 202A-N may be determined by the RAID volume module 300B and the RAID array module 300C respectively. Firmware information (e.g., software that is embedded in a hardware device) of the RAID controller 202A-N may be retrieved by the firmware module 302.

A list of possible RAID levels may be determined by the RAID level module 304 based on compatibility with the RAID controller 200A-N and usable physical disks. The disk module 308 may determine a list of unconfigured and usable physical disks of the set of physical disks 204, 206, 208 and communicate with the read/write policy module 310 to retrieve read/write attributes of each available physical disk that may be supported by the firmware. The segment attribute module 306 may locate free space segments on the set of physical disks that are already configured. In addition, cache policy and strip sizes allowed by the firmware of the RAID controller (e.g., the RAID controller 202A-N of 2) may be determined by the cache policy module 312 and/or the strip size policy module 314 respectively. The span count module 316 may determine a span count for a given RAID level taking into consideration physical configuration and firmware information. A number of physical disks which can be used in a current system configuration for one span may also be determined by the span count module 316. Next, the configuration module 200 may analyze each available physical disk to determine a disk type and availability of physical disks of a same type that may be used to create the given RAID level. Usability of each physical disk of the set of physical disks 204, 206, 208 may be analyzed based on current system settings.

The RAID size module 320 may return current available space on a RAID volume for current configuration selections. Validity of the current configuration selections may be verified through the validation module 322 and the configuration may be created by the commit module 324.

FIG. 4 is a table view of content provided to a management module 200 by the configuration module 400, according to one embodiment. The table in FIG. 4 may include a controller field 400, a configured field 402, a configuration allowability field 404, a possible RAID levels field 406, a read/write field 408, a strip size field 410, and/or a minimum/maximum disk per span field 412.

The controller field may be a name and/or an identification tag associated with the RAID controller (e.g., a RAID controller 202A-N of FIG. 2). The configured field 402 may be a reference index indicating whether an underlying RAID implementation of the RAID controller (e.g., a RAID controller 202A-N of FIG. 2) has been configured. The possible RAID levels field 406 indicates a compatible RAID levels with the underlying RAID implementation. The read/write field 408 indicates the read/write attributes of the set of physical disks of the underlying RAID implementation. The strip size field 410 indicates the allowable strip sizes and the min/max disk per span 412 indicates number of disks per span.

For example, two controllers are illustrated in FIG. 4 (e.g., 'Controller 1' and 'Controller 2'). The Controller 1 has a configured field value 'YES' indicating that the underlying RAID implementation has been configured, a configuration allowability value 'YES' indicating that configuration is allowed, the possible raid levels are '0, 3, 4', the read/write field value 'R,W' indicating that both reads and writes are allowed, a strip size value of '8 KB, 32 KB' indicating the allowed strip sizes, and min/max disk per span value of '2/12' indicating the minimum disk per span is two and the maximal disk per span is twelve.

The Controller 2 has the configured field value 'NO' indicating that the underlying RAID implementation has not been configured, the configuration allowability value 'YES' indicating that configuration is allowed, the possible raid levels are '1, 2, the read/write field value 'R,W' indicating that both reads and writes are allowed, a strip size value of '64 KB, 128 KB', and min/max disk per span value of '4/8' indicating the minimum disk per span is four and the maximal disk per span is eight.

Figure 5:
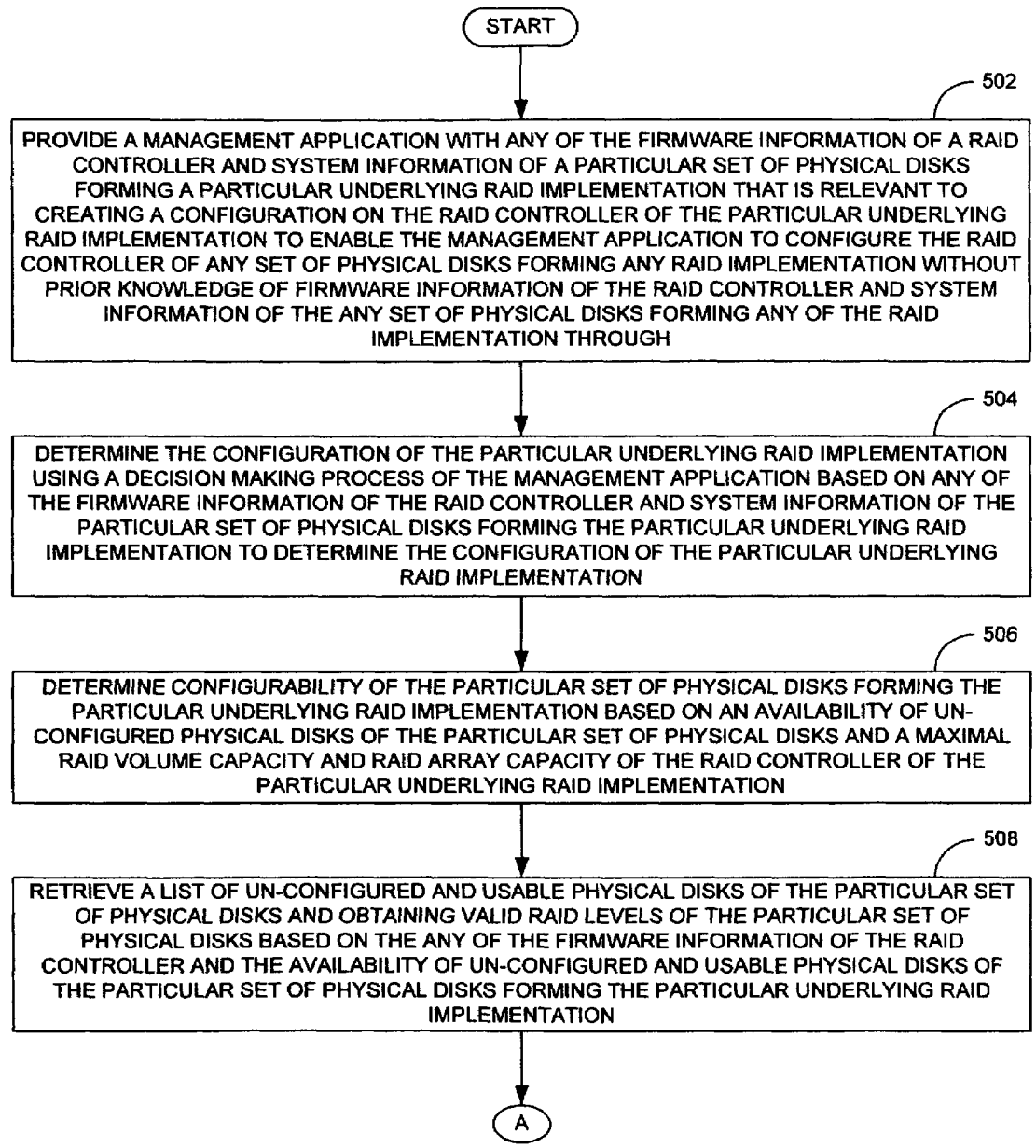
FIG. 5 is a process flow of providing a management application with firmware information of a RAID controller and/or system information of a particular set of physical disks forming a particular underlying RAID implementation, according to one embodiment.

FIG. 5 is a process flow of providing the management application with any of the firmware information of a RAID controller and system information of a particular set of physical disks forming a particular underlying RAID implementation, according to one embodiment. In operation 502, the management application (e.g., a management module 100 of FIGS. 1-2) may be provided with any of the firmware information of the RAID controller (e.g., a RAID controller 102 of FIG. 1, a RAID controller 202A-N of FIG. 2) and system information of the particular set of physical disks (e.g., a set of physical disks 104 of FIG. 1, a set of physical disks 204, 206, 208 of FIG. 2) forming the particular underlying RAID implementation that may be relevant for creating the configuration on the RAID controller (e.g., the RAID controller 102 of FIG. 1, the RAID controller 202A-N of FIG. 2) of the particular underlying RAID implementation to enable the management application (e.g., the management module 100 of FIGS. 1-2) to configure the RAID controller (e.g., the RAID controller 102 of FIG. 1, the RAID controller 202A-N of FIG. 2) of any set of physical disks (e.g., a set of physical disks 104 of FIG. 1, a set of physical disks 204, 206, 208 of FIG. 2) forming any RAID implementation without prior knowledge of firmware information of the RAID controller (e.g., the RAID controller 102 of FIG. 1, the RAID controller 202A-N of FIG. 2) and system information of the any set of physical disks (e.g., a set of physical disks 104 of FIG. 1, a set of physical disks 204, 206, 208 of FIG. 2) forming any of the RAID implementation through.

In operation 504, the configuration of the particular underlying RAID implementation may be determined using a decision making process of the management application (e.g., the management module 100 of FIGS. 1-2) based on any of the firmware information of the RAID controller (e.g., the RAID controller 102 of FIG. 1, the RAID controller 202A-N of FIG. 2) and system information of the particular set of physical disks forming the particular underlying RAID implementation to determine the configuration of the particular underlying RAID implementation. In operation 506, configurability of the particular set of physical disks (e.g., a set of physical disks 104 of FIG. 1, a set of physical disks 204, 206, 208 of FIG. 2) forming the particular underlying RAID implementation may be determined based on an availability of un-configured physical disks of the particular set of physical disks (e.g., a set of physical disks 104 of FIG. 1, a set of physical disks 204, 206, 208 of FIG. 2) and a maximal RAID volume capacity and RAID array capacity of the RAID controller (e.g., a RAID controller 102 of FIG. 1, a RAID controller 202A-N of FIG. 2) of the particular underlying RAID implementation.

In operation 508, a list of un-configured and usable physical disks (e.g., a set of physical disks 104 of FIG. 1, a set of physical disks 204, 206, 208 of FIG. 2) of the particular set of physical disks may be retrieved and obtained valid RAID levels of the particular set of physical disks based on the any of the firmware information of the RAID controller (e.g., the RAID controller 102 of FIG. 1, the RAID controller 202A-N of FIG. 2) and the availability of un-configured and usable physical disks of the particular set of physical disks (e.g., the set of physical disks 104 of FIG. 1, the set of physical disks 204, 206, 208 of FIG. 2) forming the particular underlying RAID implementation.

Figure 6:
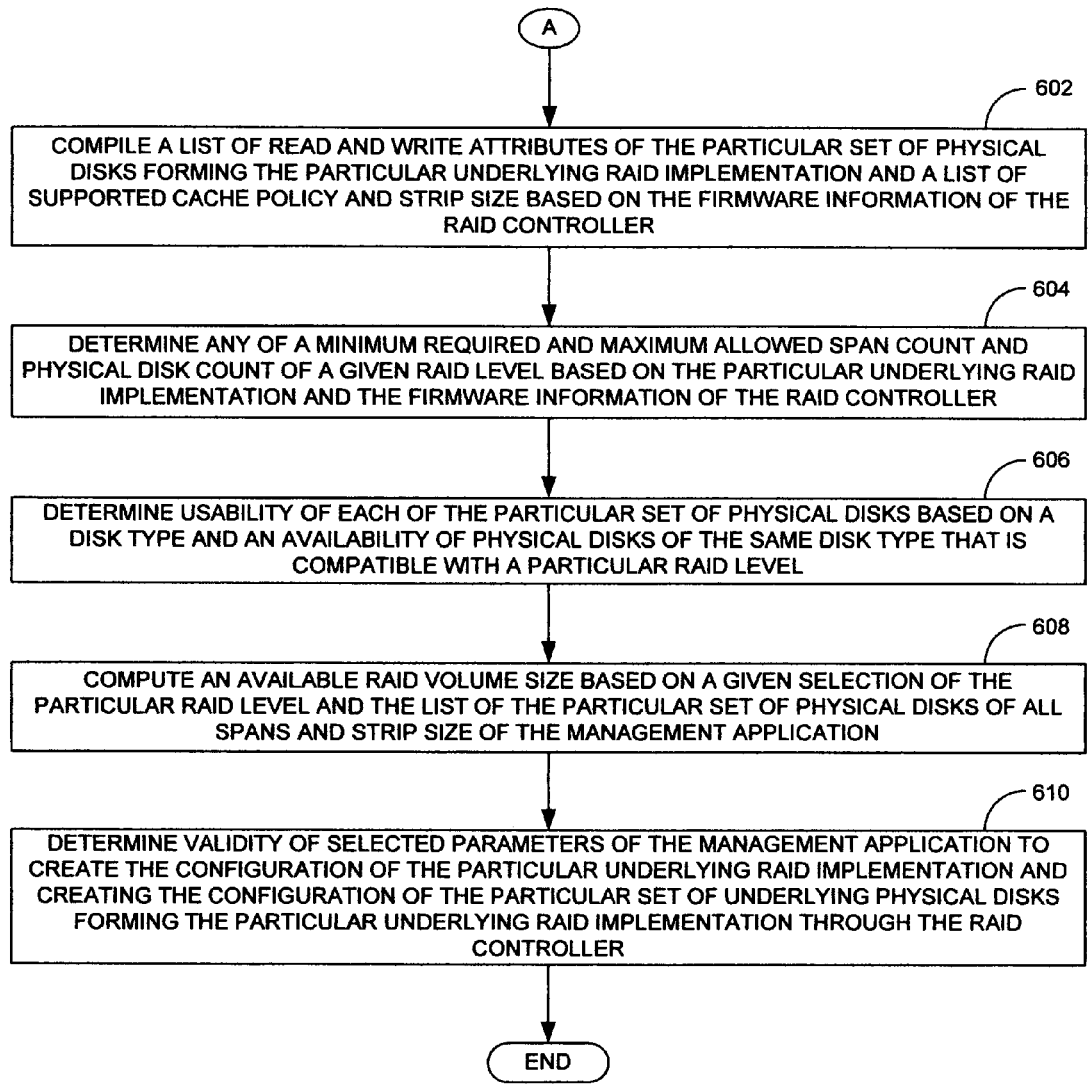
FIG. 6 is a process flow that further describes FIG. 5, according to one embodiment.

FIG. 6 is a process diagram that further describes the operations of FIG. 5, according to one embodiment. In operation 602, a list of read and write attributes of the particular set of physical disks (e.g., the set of physical disks 104 of FIG. 1, the set of physical disks 204, 206, 208 of FIG. 2) forming the particular underlying RAID implementation and a list of supported cache policy and strip size may be compiled based on the firmware information of the RAID controller. In operation

604, any of a minimum required and maximum allowed span count and physical disk count of a given RAID level may be determined based on the particular underlying RAID implementation and the firmware information of the RAID controller (e.g., a RAID controller 102 of FIG. 1, a RAID controller 202A-N of FIG. 2). In operation 608, usability of each of the particular set of physical disks (e.g., the set of physical disks 104 of FIG. 1, the set of physical disks 204, 206, 208 of FIG. 2) may be determined based on a disk type and an availability of physical disks of a same disk type that may be compatible with a particular RAID level.

In operation 608, an available RAID volume size may be computed based on a given selection of the particular RAID level and the list of the particular set of physical disks (e.g., the set of physical disks 104 of FIG. 1, the set of physical disks 204, 206, 208 of FIG. 2) of all spans and strip size of the management application (e.g., the management module 100 of FIGS. 1-2). In operation 610, validity of selected parameters of the management application (e.g., the management module 100 of FIGS. 1-2) may be determined to create the configuration of the particular underlying RAID implementation and creating the configuration of the particular set of underlying physical disks forming the particular underlying RAID implementation through the RAID controller (e.g., the RAID controller 102 of FIG. 1, the RAID controller 202A-N of FIG. 2).

Figure 7:
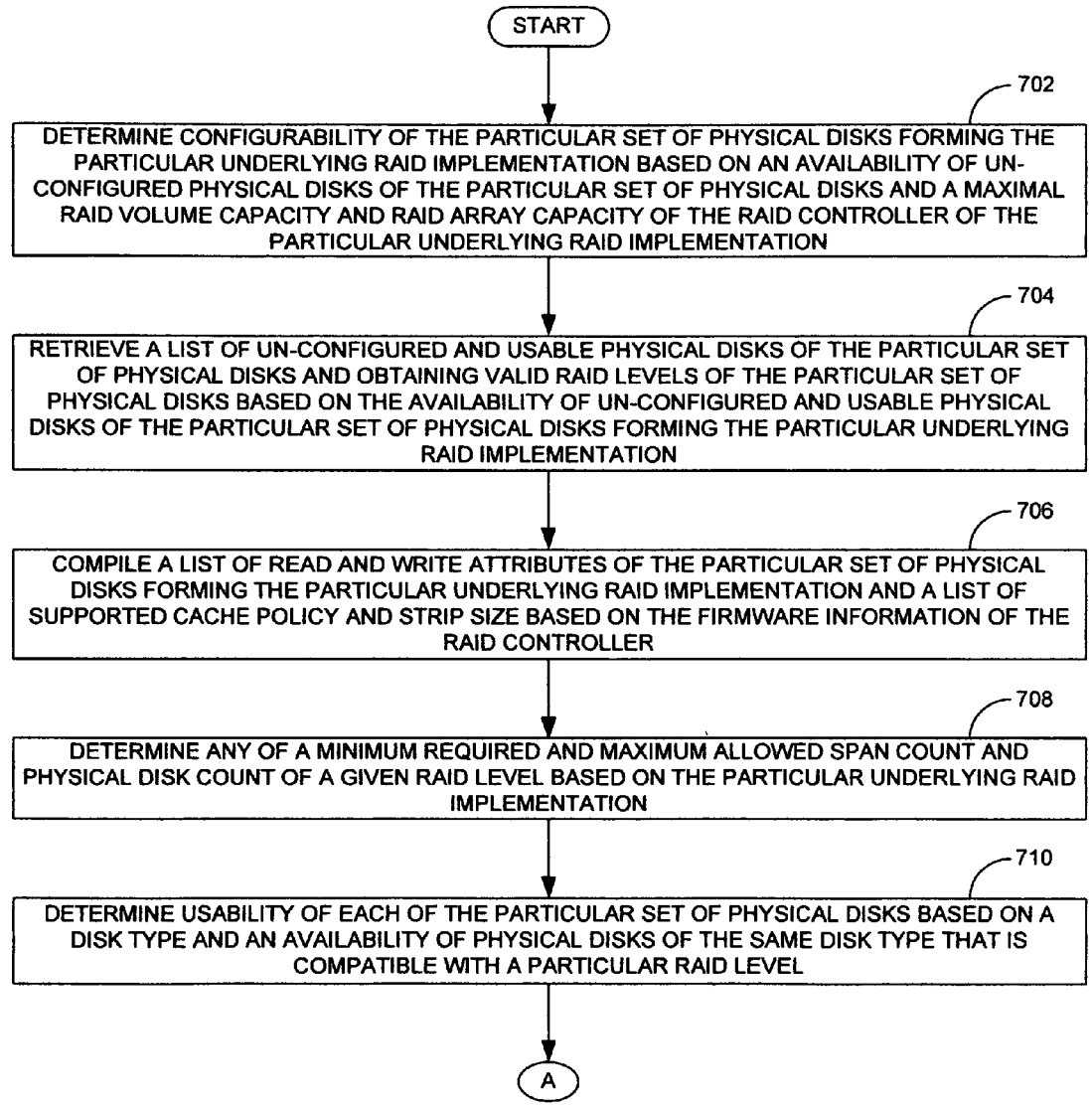
FIG. 7 is a process flow of determining configurability of the particular set of physical disks forming the particular underlying RAID implementation, according to one embodiment.

FIG. 7 is a process flow of determining configurability of the particular set of physical disks forming the particular underlying RAID implementation, according to one embodiment. In operation 702, configurability of the particular set of physical disks forming the particular underlying RAID implementation may be determined based on an availability of un-configured physical disks of the particular set of physical disks (e.g., the set of physical disks 104 of FIG. 1, the set of physical disks 204, 206, 208 of FIG. 2) and the maximal RAID volume capacity and RAID array capacity of the RAID controller (e.g., a RAID controller 102 of FIG. 1, a RAID controller 202A-N of FIG. 2) of the particular underlying RAID implementation. In operation 704, the list of un-configured and usable physical disks of the particular set of physical disks (e.g., the set of physical disks 104 of FIG. 1, the set of physical disks 204, 206, 208 of FIG. 2) may be retrieved and obtaining valid RAID levels of the particular set of physical disks (e.g., the set of physical disks 104 of FIG. 1, the set of physical disks 204, 206, 208 of FIG. 2) based on the availability of un-configured and usable physical disks of the particular set of physical disks (e.g., the set of physical disks 104 of FIG. 1, the set of physical disks 204, 206, 208 of FIG. 2) forming the particular underlying RAID implementation.

In operation 706, the list of read and write attributes of the particular set of physical disks forming the particular underlying RAID implementation and the list of supported cache policy and strip size may be compiled based on the firmware information of the RAID controller (e.g., a RAID controller 102 of FIG. 1, a RAID controller 202A-N of FIG. 2). In operation 708, any of the minimum required and maximum allowed span count and physical disk count of the given RAID level may be determined based on the particular underlying RAID implementation. In operation 710, usability of each of the particular set of physical disks (e.g., the set of physical disks 104 of FIG. 1, the set of physical disks 204, 206, 208 of FIG. 2) may be determined based on a disk type and the availability of physical disks of the same disk type that is compatible with a particular RAID level.

Figure 8:
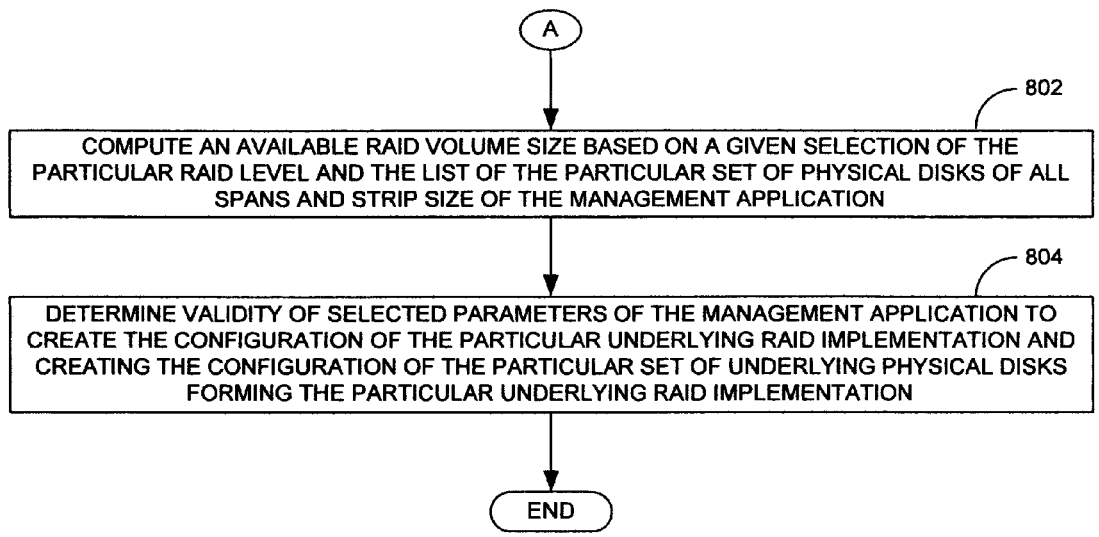
FIG. 8 is a process flow that describes FIG. 7, according to one embodiment.

FIG. 8 is a process diagram that describes further the operations of FIG. 7, according to one embodiment. In operation 802, the available RAID volume size may be computed based on the given selection of the particular RAID level and the list of the particular set of physical disks of all spans and strip size of the management application. In operation 804, validity of selected parameters of the management application may be determined to create the configuration of the particular underlying RAID implementation and creating the configuration of the particular set of underlying physical disks (e.g., the set of physical disks 104 of FIG. 1, the set of physical disks 204, 206, 208 of FIG. 2) forming the particular underlying RAID implementation.

Figure 9:
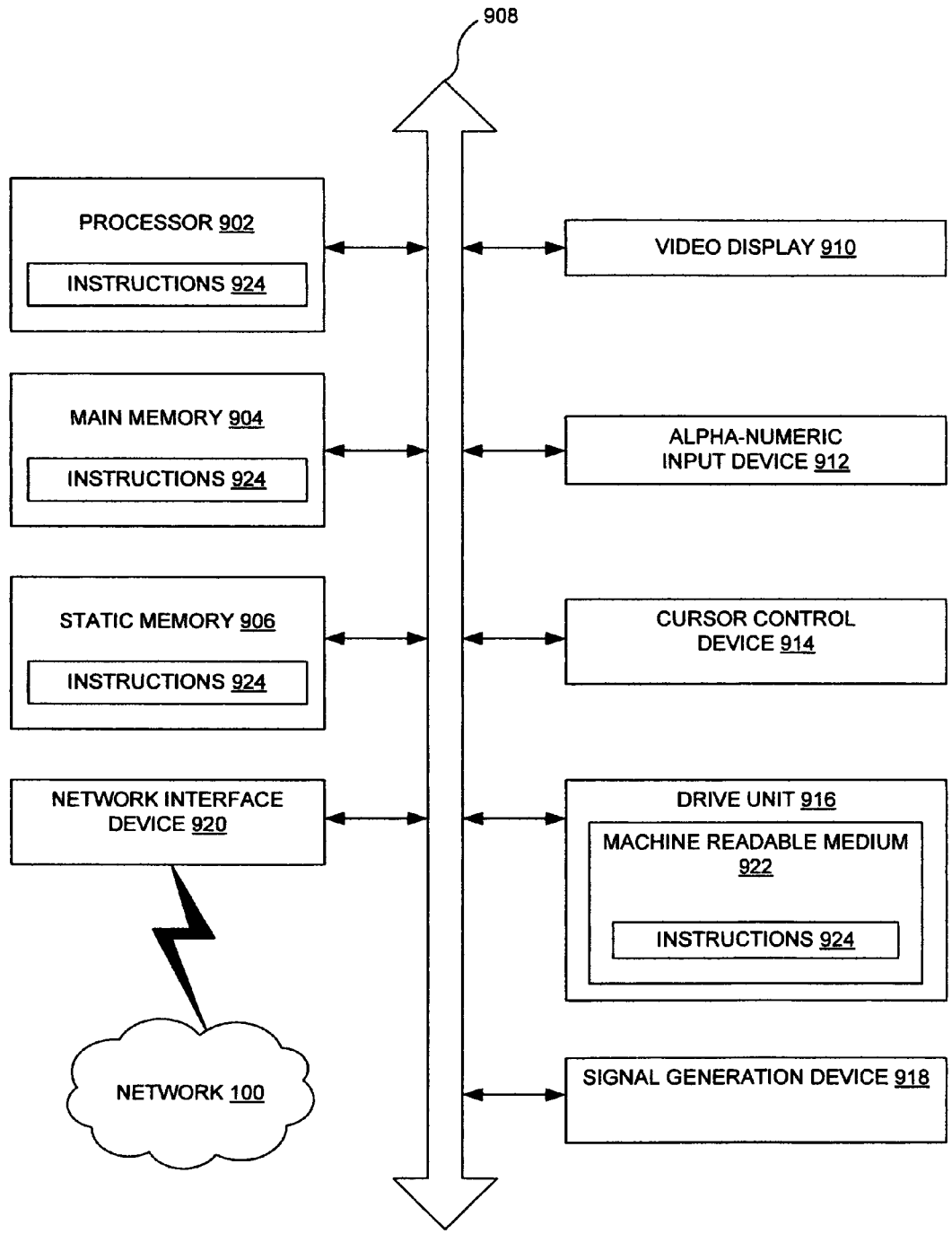
FIG. 9 is a diagrammatic representation of a machine in the form of a data processing system within a set of instructions, for causing the machine to perform any one or more of the methodologies discussed herein, may be executed, according to one embodiment.

FIG. 9 shows a diagrammatic representation of a machine in the example form of a computer system 900 within which a set of instructions, for causing the machine to perform any one or more of the methodologies discussed herein, may be executed. In various embodiments, the machine operates as a standalone device and/or may be connected (e.g., networked) to other machines. In a networked deployment, the machine may operate in the capacity of a server and/or a client machine in server-client network environment, and/or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch and/or bridge, an embedded system and/or any machine capable of executing a set of instructions (sequential and/or otherwise) that specify actions to be taken by that machine. Further, while only a single machine is illustrated, the term "machine" shall also be taken to include any collection of machines that individually and/or jointly execute a set (or multiple sets) of instructions to perform any one and/or more of the methodologies discussed herein.

The example computer system 900 includes a processor 902 (e.g., a central processing unit (CPU) a graphics processing unit (GPU) and/or both), a main memory 904 and a static memory 907, which communicate with each other via a bus 908. The computer system 900 may further include a video display unit 910 (e.g., a liquid crystal display (LCD) and/or a cathode ray tube (CRT)). The computer system 900 also includes an alphanumeric input device 912 (e.g., a keyboard), a cursor control device 914 (e.g., a mouse), a disk drive unit 917, a signal generation device 918 (e.g., a speaker) and a network interface device 920.

The disk drive unit 917 includes a machine-readable medium 922 on which is stored one or more sets of instructions (e.g., software 924) embodying any one or more of the methodologies and/or functions described herein. The software 924 may also reside, completely and/or at least partially, within the main memory 904 and/or within the processor 902 during execution thereof by the computer system 900, the main memory 904 and the processor 902 also constituting machine-readable media The software 924 may further be transmitted and/or received over a network 927 via the network interface device 920. While the machine-readable medium 922 is shown in an example embodiment to be a single medium, the term "machine-readable medium" should be taken to include a single medium and/or multiple media (e.g., a centralized and/or distributed database, and/or associated caches and servers) that store the one or more sets of instructions. The term "machine-readable medium" shall also be taken to include any medium that is capable of storing, encoding and/or carrying a set of instructions for execution by the machine and that cause the machine to perform any one or more of the methodologies of the various embodiments. The term "machine-readable medium" shall accordingly be taken to include, but not be limited to, solid-state memories, optical and magnetic media, and carrier wave signals.

Although the present embodiments have been described with reference to specific example embodiments, it will be evident that various modifications and changes may be made to these embodiments without departing from the broader spirit and scope of the various embodiments. For example, the various devices, modules, analyzers, generators, etc. described herein may be enabled and operated using hardware circuitry (e.g., CMOS based logic circuitry), firmware, software and/or any combination of hardware, firmware, and/or software (e.g., embodied in a machine readable medium). For example, the various electrical structure and methods may be embodied using transistors, logic gates, and electrical circuits (e.g., application specific integrated ASIC circuitry).

For example, the management module 100 of FIG. 1, the configuration module 200 of FIG. 2, the configurability module 300, the disk availability module 300A, the RAID volume module 300B, the RAID array module 300C, the firmware module 302, the RAID level module 304, the segment attribute module 306, the disk module 308, the read/write policy module 310, the cache policy module 312, the strip size module 314, the span count module 316, the disk count module 318, the RAID size module 320, the validation module 322, and/or the commit module 324 of FIG. 3 may be enabled using transistors, logic gates, and electrical circuits (e.g., application specific integrated ASIC circuitry) using a client device circuit, a storage module circuit, a virtualization circuit, a recovery circuit, an events circuit, a network circuit, an instantiation circuit, an export circuit, a pausing circuit, a SCSI circuit, a fiber channel circuit, a continuous data protection circuit, a delayed roll forward circuit, a delayed roll backward circuit, a coalescing circuit, and/or an event detector circuit.

In addition, it will be appreciated that the various operations, processes, and methods disclosed herein may be embodied in a machine-readable medium and/or a machine accessible medium compatible with a data processing system (e.g., a computer system), and may be performed in any order. Accordingly, the specification and drawing are to be regarded in an illustrative rather than a restrictive sense.

What is claimed is:

1. A method, comprising:
providing a management application with at least one of a firmware information of a RAID controller and system information of a particular set of physical disks forming a particular underlying RAID implementation that is relevant to creating a configuration on the RAID controller of the particular underlying RAID implementation, wherein the management application configures the RAID controller of at least one physical disk forming any RAID implementation without prior knowledge of firmware information of the RAID controller and system information of the at least one physical disk forming the any RAID implementation;
determining the configuration of the particular underlying RAID implementation using a decision making process of the management application based on at least one of the firmware information of the RAID controller and system information of the particular set of physical disks forming the particular underlying RAID implementation to determine the configuration of the particular underlying RAID implementation, and
determining validity of selected parameters of the management application to create the configuration of the particular underlying RAID implementation and creating the configuration of the particular set of underlying physical disks forming the particular underlying RAID implementation through the RAID controller that is communicatively coupled to a host computer.

2. The method of claim 1 wherein the particular set of physical disks forming the particular underlying RAID implementation is at least one of an un-configured set of physical disks and a configured set of physical disks having space available for configuration.

3. The method of claim 2 further comprising determining configurability of the particular set of physical disks forming the particular underlying RAID implementation based on an availability of un-configured physical disks of the particular set of physical disks and a maximal RAID volume capacity and RAID array capacity of the RAID controller of the particular underlying RAID implementation.

4. The method of claim 3 further comprising retrieving a list of un-configured and usable physical disks of the particular set of physical disks and obtaining valid RAID levels of the particular set of physical disks based on the at least one of the firmware information of the RAID controller and the availability of un-configured and usable physical disks of the particular set of physical disks forming the particular underlying RAID implementation.

5. The method of claim 4 further comprising compiling a list of read and write attributes of the particular set of physical disks forming the particular underlying RAID implementation and a list of supported cache policy and strip size based on the firmware information of the RAID controller.

6. The method of claim 5 further comprising determining at least one of a minimum required and maximum allowed span count and physical disk count of a given RAID level based on the particular underlying RAID implementation and the firmware information of the RAID controller.

7. The method of claim 6 further comprising determining usability of each of the particular set of physical disks based on a disk type and an availability of physical disks of the same disk type that is compatible with a particular RAID level.

8. The method of claim 7 further comprising computing an available RAID volume size based on a given selection of the particular RAID level and a list of the particular set of physical disks of all spans and strip size of the management application.

9. A RAID controller, comprising:
a host I/O port coupled to communicate with a host computer;
at least one physical disk I/O port coupled to communicate with a set of physical disks that forms a RAID implementation;
a host I/O processor that communicates with the host I/O port to perform I/O transactions with the host computer through the host I/O port;
a cache memory;
a physical disk I/O processor to access host data in the cache memory and to communicate with the set of physical disks; and
a configuration module to provide a management application with system information of a particular set of physical disks forming a particular underlying RAID implementation that is relevant to creating a configuration on the RAID controller of the particular underlying RAID implementation, wherein the management application configures at least one physical disk forming any RAID implementation without prior knowledge of system information of the at least one physical disk; wherein the configuration module determines validity of selected parameters of the management application to create the configuration of the particular underlying RAID implementation and creating the configuration of the particular set of physical disks forming the particular underlying RAID implementation.

10. The RAID controller of claim 9 wherein the particular set of physical disks forming the particular underlying RAID implementation is at least one of an un-configured set of physical disks and a configured set of physical disks having space available for configuration.

11. The RAID controller of claim 10 wherein the configuration module determines configurability of the particular set of physical disks forming the particular underlying RAID implementation based on an availability of un-configured physical disks of the particular set of physical disks and a maximal RAID volume capacity and RAID array capacity of the RAID controller of the particular underlying RAID implementation.

12. The RAID controller of claim 11 wherein the configuration module retrieves a list of un-configured and usable physical disks of the particular set of physical disks and obtaining valid RAID levels of the particular set of physical disks based on the availability of un-configured and usable physical disks of the particular set of physical disks forming the particular underlying RAID implementation.

13. The RAID controller of claim 12 wherein the configuration module compiles a list of read and write attributes of the particular set of physical disks forming the particular underlying RAID implementation and a list of supported cache policy and strip size based on a firmware information of the RAID controller.

14. The RAID controller of claim 13 wherein the configuration module determines at least one of a minimum required and maximum allowed span count and physical disk count of a given RAID level based on the particular underlying RAID implementation.

15. The RAID controller of claim 14 wherein the configuration module determines usability of each of the particular set of physical disks based on a disk type and an availability of physical disks of a same disk type that is compatible with a particular RAID level.

16. The RAID controller of claim 15 wherein the configuration module computes an available RAID volume size based on a given selection of the particular RAID level and the list of the particular set of physical disks of all spans and strip size of the management application.

17. A system, comprising:
a RAID controller module that is communicatively coupled to a host computer to utilize of a set of physical disks forming any RAID implementation;
a configuration module coupled to the RAID controller module that obtains at least one of a firmware information of the RAID controller module and system information of a particular set of physical disks forming a particular underlying RAID implementation that is relevant to creating a configuration on the RAID controller module of the particular underlying RAID implementation wherein the configuration module determines validity of selected parameters of the management application to create the configuration of the particular underlying RAID implementation and creating the configuration of the particular set of physical disks forming the particular underlying RAID implementation; and
a management module coupled to the configuration module that is able to configure the RAID controller module of at least one of set of physical disks forming any RAID implementation without prior knowledge of firmware information of the RAID controller module and system information of the at least one of set of physical disks forming the any RAID implementation through obtaining the firmware information and system information via the configuration module during configuration.

18. The system of claim 17 wherein the configuration module facilitates a decision making process of the management module based on at least one of the firmware information of the RAID controller module and system information of the particular set of physical disks forming the particular underlying RAID implementation to determine the configuration of the particular underlying RAID implementation.

* * * * *